United States Patent
Moyer

(10) Patent No.: US 8,145,985 B2
(45) Date of Patent: Mar. 27, 2012

(54) ERROR DETECTION SCHEMES FOR A UNIFIED CACHE IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 768 days.

(21) Appl. No.: 12/205,210

(22) Filed: Sep. 5, 2008

(65) Prior Publication Data

US 2010/0064181 A1 Mar. 11, 2010

(51) Int. Cl.
*H03M 13/00* (2006.01)

(52) U.S. Cl. .......... 714/799; 714/6.12; 714/763; 714/48

(58) Field of Classification Search ................ 714/6, 48, 714/763, 799
See application file for complete search history.

(56) References Cited

U.S. PATENT DOCUMENTS

| | | | |
|---|---|---|---|
| 5,479,641 A | 12/1995 | Nadir et al. |
| 5,488,691 A | 1/1996 | Fuoco et al. |
| 5,630,055 A | 5/1997 | Bannon et al. |
| 5,875,201 A | 2/1999 | Bauman et al. |
| 5,958,068 A | 9/1999 | Arimilli et al. |
| 5,961,660 A | 10/1999 | Capps, Jr. et al. |
| 6,092,182 A | 7/2000 | Mahalingaiah |
| 6,567,952 B1 | 5/2003 | Quach et al. |
| 6,571,317 B2 | 5/2003 | Supnet |
| 6,654,925 B1 | 11/2003 | Meaney et al. |
| 6,804,763 B1 | 10/2004 | Stockdale et al. |
| 6,804,799 B2 | 10/2004 | Zuraski, Jr. |
| 6,898,738 B2 | 5/2005 | Ryan et al. |
| 7,124,170 B1 | 10/2006 | Sibert |
| 7,254,748 B1 | 8/2007 | Wright et al. |
| 7,430,145 B2 | 9/2008 | Weiss et al. |
| 7,461,321 B2 | 12/2008 | Lesartre |

(Continued)

FOREIGN PATENT DOCUMENTS

EP 0418457 B1 1/1997

OTHER PUBLICATIONS

MPC7450 RISC Microprocessor Family Reference Manual Rev.5 , Programming Environments Manual, Jan. 2005, Title Page, Information Page, Table of Contents and Chapter 3 (pp. 3-1 thru 3-101), Freescale Semiconductor, Inc.

(Continued)

*Primary Examiner* — Guy Lamarre
(74) *Attorney, Agent, or Firm* — Joanna G. Chiu; Robert L. King

(57) ABSTRACT

In a data processing system processing circuitry executes a plurality of data processing instructions. A unified cache memory stores data and instructions processed by the processing circuitry. The unified cache memory has a plurality of sets, each set having a plurality of ways, each with one or more information fields. Cache memory control circuitry has a control register for controlling allocation of each way of the plurality of ways for one of: (1) a first type of information; (2) a second type of information; or (3) both the first type of information and the second type of information. The cache memory control circuitry further individually controls a selection of a type of error detection among a plurality of types of error detection for each way of the unified cache memory based upon the allocation control indicated by the control register.

20 Claims, 4 Drawing Sheets

U.S. PATENT DOCUMENTS

2003/0084369 A1    5/2003   Kane et al.
2005/0132263 A1    6/2005   Anderson et al.
2006/0221817 A1*   10/2006   Nishida et al. ............... 370/216
2007/0044004 A1    2/2007   Hino et al.
2008/0140962 A1    6/2008   Pattabiraman et al.
2008/0162854 A1*   7/2008   Hashimoto et al. ........... 711/167
2008/0229000 A1*   9/2008   Kim ............................. 711/103

OTHER PUBLICATIONS

U.S. Appl. No. 12/112,580, filed Apr. 30, 2008.
PCT/US2009/048772 International Search Report and Written Opinion mailed Dec. 31, 2009 in corresponding application.
Office Action mailed Nov. 2, 2011 in U.S. Appl. No. 12/205,222.

\* cited by examiner

FIG. 4

| WAY 0 ALLOCATION CONTROL | WAY 1 ALLOCATION CONTROL | WAY 2 ALLOCATION CONTROL | WAY 3 ALLOCATION CONTROL | WAY 4 ALLOCATION CONTROL | WAY 5 ALLOCATION CONTROL | WAY 6 ALLOCATION CONTROL | WAY 7 ALLOCATION CONTROL |
|---|---|---|---|---|---|---|---|
| 0  1 | 2  3 | 4  5 | 6  7 | 8  9 | 10  11 | 12  13 | 14  15 |

| BITS | NAME | DESCRIPTION |
|---|---|---|
| 0:1 | WAY 0 ALLOCATION CONTROL | WAY 0 ALLOCATION CONTROL.<br>00 = RESERVED<br>01 = THE CORRESPONDING WAY (0) IS AVAILABLE FOR REPLACEMENT BY INSTRUCTION MISS LINE FILLS.<br>10 = THE CORRESPONDING WAY (0) IS AVAILABLE FOR REPLACEMENT BY DATA MISS LINE FILLS.<br>11 = THE CORRESPONDING WAY (0) IS AVAILABLE FOR REPLACEMENT BY DATA OR INSTRUCTION MISS LINE FILLS. |
| ... | ... | ... |
| 14:15 | WAY 7 ALLOCATION CONTROL | WAY 7 ALLOCATION CONTROL.<br>00 = RESERVED<br>01 = THE CORRESPONDING WAY (7) IS AVAILABLE FOR REPLACEMENT BY INSTRUCTION MISS LINE FILLS.<br>10 = THE CORRESPONDING WAY (7) IS AVAILABLE FOR REPLACEMENT BY DATA MISS LINE FILLS.<br>11 = THE CORRESPONDING WAY (7) IS AVAILABLE FOR REPLACEMENT BY DATA OR INSTRUCTION MISS LINE FILLS. |

ERROR DETECTION SCHEMES FOR A UNIFIED CACHE IN A DATA PROCESSING SYSTEM

CROSS-REFERENCE TO RELATED APPLICATION

This application is related to Ser. No. 12/205,222, filed on even date, entitled "Error Detection Schemes for a Cache in a Data Processing System" naming William C. Moyer, Quyen Pho, and Michael J. Rochford as inventors, and assigned to the current assignee hereof.

BACKGROUND

1. Field

This disclosure relates generally to data processing systems, and more specifically, to error detection schemes for a unified cache.

2. Related Art

Unified caches are typically used in data processing systems to store multiple types of information, such as both instruction information and data information (e.g. operand information). Error detection for these unified caches improves reliability. Error detection code (EDC), error correction code (ECC), and parity protection types are commonly used to provide error detection and/or error correction for memories. However, the use of EDC/ECC for unified caches is problematic. Although EDC or ECC typically supports a higher level of error detection as compared to using parity, the complexity of the unified cache is greatly increased and the performance is reduced. Certain users, though, place a higher emphasis on error detection than others and are willing to sacrifice some performance to obtain a certain level of safety certification. Other users are not as stringent with respect to error detection and are therefore not willing to sacrifice performance for additional error detection capabilities. These conflicting needs further increases the difficulties faced when designing unified caches.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates, in diagrammatic form, an allocation control register for use with the unified cache of FIGS. 2 and 3 in accordance with one embodiment of the present invention.

FIG. 5 illustrates, in table form, descriptions of various fields of the allocation control register of FIG. 4, in accordance with one embodiment of the present invention.

DETAILED DESCRIPTION

In one embodiment, a unified cache may use different error detection schemes based on the way-partitioning of the unified cache. For example, in way-partitioning, each way of a unified cache may be allocated to different information types, such as to either instruction information or data information or to both instruction and data information. In one embodiment, this partitioning is done via a way partitioning or way allocation control register setting. In one embodiment, the allocation for a particular way is used to determine the error detection and/or correction scheme to be used by that particular way. For example, those ways which are allocated for instruction information storage may be configured to use multiple-bit EDC, while the remaining ways which are allocated to data information or both data and instruction information may be configured to use single-bit parity checking (e.g. byte parity checking).

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
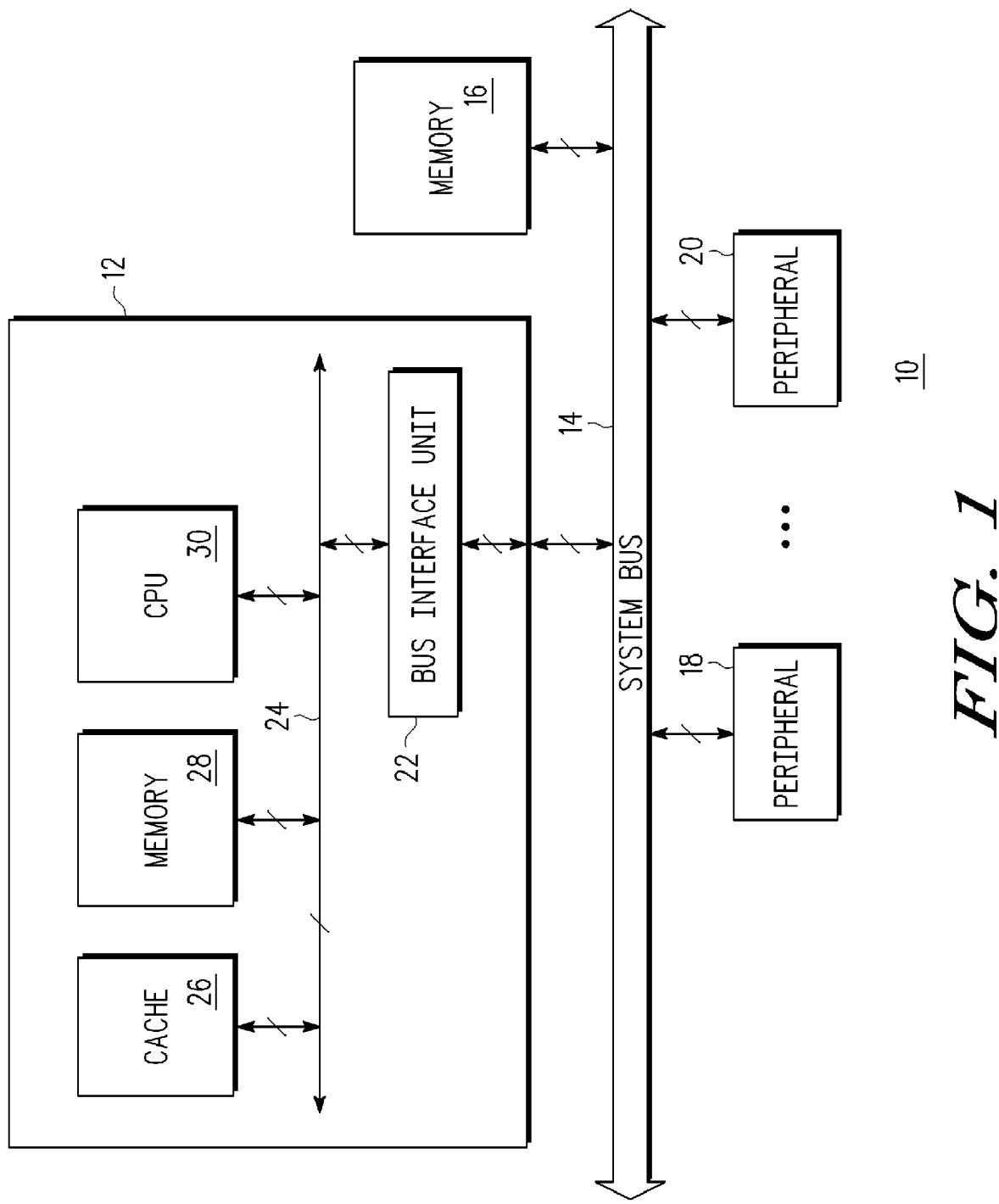
FIG. 1 illustrates in block diagram form a data processing system in accordance with one embodiment of the present invention.

FIG. 1 illustrates, in block diagram form, a data processing system 10 in accordance with one embodiment of the present invention. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a memory 28, and a central processing unit (CPU) 30. CPU 30 implements data processing operations. Each of cache 26, memory 28, and CPU 30 are coupled to the internal bus via respective bidirectional conductors. Note that memory 28 and memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit.

In operation, the processor 12 functions to implement a variety of data processing functions by executing a plurality of data processing instructions. Cache 26 is a temporary data store for frequently-used information that is needed by CPU 30. Cache 26 is a set-associative unified cache which is capable of storing multiple types of information, such as instruction information and data information (e.g. operand information). Information needed by CPU 30 that is not within cache 26 is stored in memory 28 or memory 16. In one embodiment, memory 28 may be referred to as an internal memory where it is internal to processor 12 while memory 16 may be referred to as an external memory where it is external to processor 12. Bus interface unit 22 is only one of several interface units between processor 12 and system bus 14. Bus interface unit 22 functions to coordinate the flow of information related to instruction execution by CPU 30. Control information and data resulting from the execution of instructions are exchanged between CPU 30 and system bus 14 via bus interface unit 22.

Figure 2:
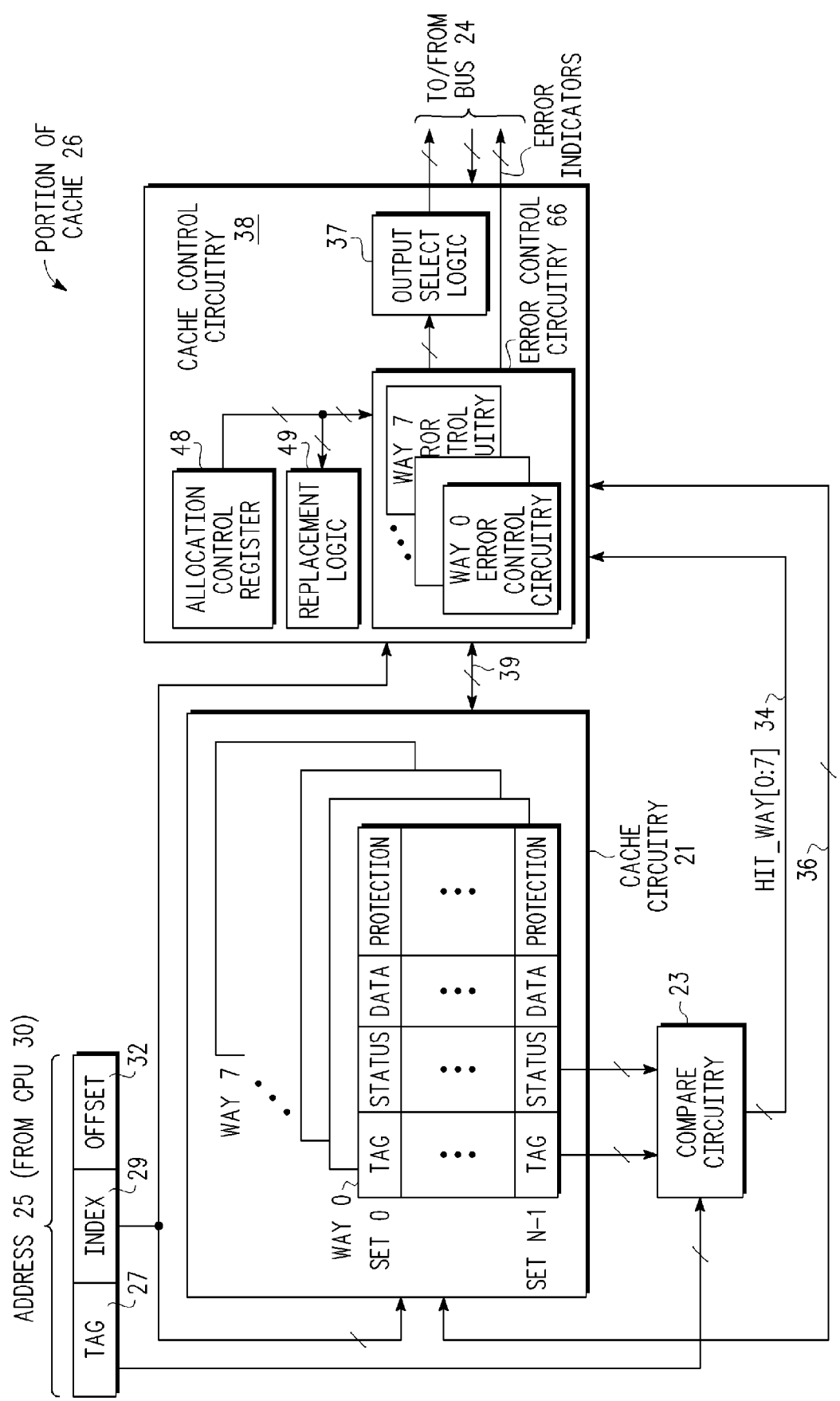
FIG. 2 illustrates in block diagram form a portion of a unified cache within the data processing system of FIG. 1 in accordance with one embodiment of the present invention.

FIG. 2 illustrates a portion of cache 26 of FIG. 1 in accordance with one embodiment. Alternate embodiments of cache 26 may use a different structure than that illustrated in FIG. 2. The portion of cache 26 illustrated in FIG. 2 has "N" sets and 8 ways, and may be referred to as a multi-way unified cache or as a multi-way set-associative unified cache. Therefore, cache 26 can be described as having N sets, each set having 8 ways. Cache 26, in alternate embodiments, may have any number of sets and any number of ways. Note that, as used herein, a cache line refers to an intersection of a cache way and a set. For example, way 0 includes N cache lines, each corresponding to one of set 0 to set N−1. Therefore, when a way is selected for replacement, the information in one or more cache lines (which is selected by index portion 29, as will be described below) is actually replaced. That is, the entire way may not be replaced, but only one or more particular lines or entries.

In the illustrated embodiment, cache circuitry 21 is storage circuitry which stores information in each of a plurality of cache lines or entries. For example, cache circuitry 21 includes tag, status, cache data, and protection fields for the cache lines or entries. Address 25 is provided from CPU 30. Address 25 includes a tag portion 27, an index portion 29, and an offset portion 32. Index portion 29 is provided to cache circuitry 21 which indicates a particular cache line or entry (i.e. one of set 0 to set N−1). Compare circuitry 23 is coupled to receive tag portion 27 and is coupled to cache circuitry 21 to receive tag and status information. Based on this received information, compare circuitry 23 determines whether there has been a cache hit or a cache miss. In the illustrated embodiment, a plurality of hit/miss signals labeled HIT_WAY[0:7] 34 are provided to cache control circuitry 38. Each HIT_WAY [0:7] 34 signal indicates whether or not there has been a cache hit for its corresponding way in cache circuitry 21. Alternate embodiments may use a cache miss signal in addition to or instead of a cache hit signal.

Cache control circuitry 38 is coupled to cache circuitry 21 by way of conductors or signals 36 and 39. Index portion 29 is also provided to the cache control circuitry 38 for indicating a particular cache line or entry (i.e. one of set 0 to set N−1) Cache control circuitry 38 includes an allocation control register 48, replacement logic 49, output select logic 37, and error control circuitry 66. Allocation control register 48 is coupled to replacement logic 49 and error control circuitry 66, and error control circuitry is coupled to output select logic 37. Error control circuitry 66 may also provide one or more error indicators to bus 24. Output select logic provides information to bus 24. Cache control circuitry 38 is also coupled to receive information from bus 24.

In the illustrated embodiment, cache circuitry 21 is a unified cache which is capable of storing multiple types of information. That is, the cache data field of each cache line may store instruction information or data information (e.g. operand information). Furthermore, as will be described in more detail below in reference to FIGS. 4 and 5, each way of cache circuitry 21 can be allocated to store a particular information type. For example, each way can be configured independently to store instruction information, data information (e.g. operand information), or both instruction and data information. In one embodiment, one or more of the ways of cache circuitry 21 can be configured to store read-only data information or modifiable data information.

FIG. 4 illustrates, in diagrammatic form, one embodiment of allocation control register 48 which includes a 2-bit way allocation control field for each of ways 0-7. FIG. 5 illustrates, in table form, descriptions for the way allocation control fields of FIG. 4. For example, way 0 allocation control field is a 2-bit field which indicates what type of information can be stored in the cache data field within way 0. For example, when way 0 allocation control field has a value of 01, way 0 is available for replacement by instruction miss line fills. That is, with a value of 01, way 0 stores instruction type information. When way 0 allocation control field has a value of 10, way 0 is available for replacement by data miss line fills. That is, with a value of 10, way 0 stores data type information. When way 0 allocation control field has a value of 11, way 0 is available for replacement by data or instruction miss line fills. That is, with a value of 11, way 0 stores both instruction type and data type information. Therefore, for each way, the corresponding way allocation control field indicates whether the corresponding way stores a first type of information (e.g. instruction type information when the corresponding way allocation control field has a value of 01), stores a second type of information (e.g. data type information when the corresponding way allocation control field has a value of 10), or both the first and second types of information (e.g. both instruction type and data types of information when the corresponding way allocation control field has a value of 11). In the illustrated embodiment, the value of 00 for each way allocation control field is reserved for possible future use. Alternate embodiments may include more or less fields, and each field may include more or less bits, as needed, to indicate the type of information to be allocated for a particular way of cache 26.

Although one type of architecture for cache 26 has been illustrated in FIG. 2, alternate embodiments of cache 26 may use any desired or appropriate architecture. The architecture illustrated in FIG. 2 is merely intended to be one possible representative architecture. Any cache architecture that allows for the desired cache replacement may be used.

Referring back to FIG. 2, in operation, index portion 29 is used to select a set in cache circuitry 21. The tag information from cache circuitry 21 is compared to tag 27 and qualified by status information (e.g. valid bits) from cache circuitry 21. The result of the compare and qualification (e.g. match and valid) determines whether or not a cache hit occurs. As described above, each HIT_WAY[0:7] 34 signal indicates whether or not there has been a cache hit for its corresponding way in cache circuitry 21.

In the case of a read access to cache 26, upon a cache hit, the cache data and protection fields of the cache line which resulted in the cache hit are provided, via conductors 39, to cache control circuitry 38. The corresponding error control circuitry within error control circuitry 66 for the way which resulted in the cache hit performs error detection and/or correction on the received cache data using the received protection information. The error detection and/or correction scheme used is selected using the settings within allocation control register 48, as will be described in more detail below with respect to FIG. 3. The cache data can then be provided to bus 24 via output select logic which, using HIT_WAY[0:7] 34, selects the output of the corresponding error control circuitry within error control circuitry 66 for the way which resulted in the cache hit. Also, note that an error indicator can also be provided to bus 24 via output select logic 37 to indicate whether or not an error has occurred. Note that if error correction is also being performed, then the corrected cache data will be output via output select logic 37 rather than the data provided from cache circuitry 21. Furthermore, if corrected cache data is being provided, the error indicator may be negated to indicate that there is no error with the cache data being provided (since it has been corrected).

In the case of a write access to cache 26, upon a cache hit, information (e.g. the cache data for storage into cache circuitry 21) can be received from bus 24 by cache control circuitry 38. The cache data can be provided by cache control circuitry 38 for storage into the appropriate cache line of cache circuitry 21 via conductors 39. Also, cache control circuitry 38 can appropriately update the status field of the cache line. (Note that the specific circuitry used to receive the cache data and route it to the line within cache circuitry 21 which caused the hit and to update the status information is not illustrated, since it is well understood in the art.) The received cache data is also provided to error control circuitry 66 so that the corresponding error control circuitry within error control circuitry 66 (as selected by HIT_WAY[0:7] 34) can generate the appropriate protection information, as will be described in more detail with respect to FIG. 3 below. This corresponding protection information may also be provided, along with the received cache data, by cache control circuitry 38 for storage into the appropriate cache line of cache circuitry 21 which resulted in the cache line hit. Note that if error correction is also being performed, then the corrected received cache data (if an error was detected) will be provided for storage into cache circuitry 21.

In the case of a cache miss, replacement logic 49, using information from allocation control register 48, identifies a cache line for replacement and updates the cache line. Any known method of cache allocation can be used to select a cache line for replacement, such as, for example, a round robin method, a pseudo-least recently used (PLRU) method, etc. Replacement logic 49 combines the replacement method with the information from allocation control register 48 to select a way for replacement which is enabled to be allocated for a particular type of information. Upon a cache miss, the new cache data for storage into the newly allocated cache line is provided to cache control circuitry 38 by bus 24. The new cache data can then be provided for storage into the newly allocated cache line of cache circuitry 21 via conductors 39. Also, cache control circuitry 38 can appropriately generate the status information for storage into the status field of the newly allocated cache line. (Note that the specific circuitry used to receive the cache data and route it to the newly allocated cache line within circuitry 21 and to generate the status information for the newly allocated cache line is not illustrated, since it is well understood in the art.) The new cache data is also provided to error control circuitry 66 so that the corresponding error control circuitry within error control circuitry 66 (corresponding to the way selected by replacement logic 49 which includes the newly allocated cache line) can generate the appropriate protection information, as will be described in more detail with respect to FIG. 3 below. This corresponding protection information may also be provided, along with the received cache data, by cache control circuitry 38 for storage into the newly allocated cache line of cache circuitry 21. Note that if error correction is also being performed, then the corrected new cache data (if an error was detected) will be provided for storage into cache circuitry 21.

In the illustrated embodiment, cache control circuitry 38 also provides control signals 36 to cache circuitry 21 (e.g. for read/write control). For example, cache control circuitry 38 may, under control of CPU 30, update cache circuitry 21. For example, CPU 30 may execute special cache instructions to update status information. Also, in one embodiment, cache control circuitry 38, under control of CPU 30, such as via special cache instructions, may update allocation control register 48 to change how the ways of cache circuitry 21 are allocated. Although FIG. 2 illustrates specific circuitry that may be used to implement a portion of cache 26 of FIG. 1, alternate embodiments may use any desired circuitry. A wide variety of circuit implementations may be used. The circuitry illustrated in FIG. 2 is merely intended to illustrate one possible embodiment.

Figure 3:
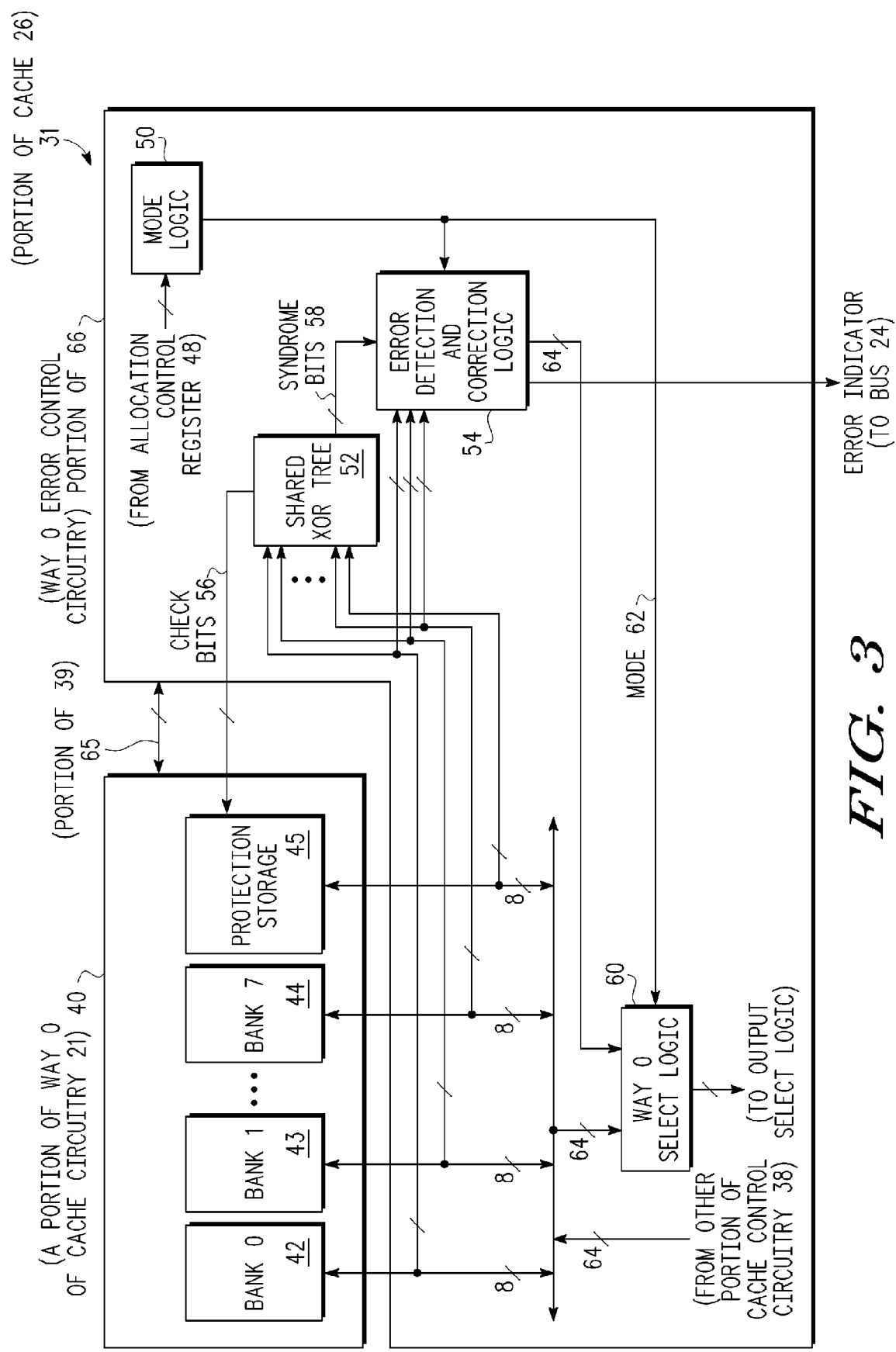
FIG. 3 illustrates in block diagram form, a portion of the unified cache of FIG. 2 in accordance with one embodiment of the present invention.

FIG. 3 illustrates circuitry 31, which represents a portion of cache 26 in accordance with one embodiment of the present invention. Circuitry 31 includes memory storage circuitry 40, which represents a portion of way 0 of cache circuitry 21. Memory storage circuitry 40 includes a number of memory banks and protection storage 45. In the illustrated embodiment, memory storage circuitry 40 includes 8 banks: bank 0 42, bank 1 43, . . . bank 7 44. Alternate embodiments may include any number of banks. In the illustrated embodiment, banks 0-7 represent the cache data portion of way 0, where each bank is 1 byte wide, and protection storage 45 represents the protection portion of way 0. Each of banks 0-7 stores N bytes, one byte corresponding to each of sets 0 to N−1. Therefore, in the illustrated embodiment, having 8 banks, each cache data field of way 0 stores a doubleword. If each cache data field of way 0 were to store more than a doubleword, circuitry 40 would include more banks, as needed, and a larger protection storage, as needed. Note also that the description herein of FIG. 3 applies analogously to each of ways 0-7.

Circuitry 31 includes way 0 error control circuitry, which is a portion of error control circuitry 66. Way 0 error control circuitry is bidirectionally coupled to memory storage circuitry 40 (to the portion of way 0 cache circuitry 21) and includes way 0 select logic 60, mode logic 50 (which is coupled to receive information from allocation control register 48), a shared exclusive-OR (XOR) tree 52, and error detection and correction logic 54. Mode logic 50, based on the value of the way 0 allocation control field of allocation control register 48, outputs a mode indicator 62 to a control input of way 0 select logic 60. In one embodiment, mode 62 indicates what error detection mode circuitry 31 is operating in. For example, in the illustrated embodiment, based on the value of the way 0 allocation control field in control register 48, mode 62 indicates whether circuitry 31 is operating in EDC/ECC mode (multi-bit error detection/error detection and correction) or parity mode (single bit error detection). In one embodiment, when the way 0 allocation control field is 01, indicating that way 0 is available for replacement by instruction miss line fills, mode 62 indicates EDC/ECC mode. When the way 0 allocation control field is 10 or 11, indicating that way 0 stores data type information or both instruction and data type information, mode 62 indicates parity mode. For example, in the case of way 0 storing data type information, it may not be desirable to perform a read-modify-write (RMW), as is done in EDC/ECC mode; therefore, parity error detection mode may be sufficient. Also, in one embodiment, if way 0 is allocated for read only data type information, mode logic 50 may also set mode 62 to indicate EDC/ECC mode.

In EDC/ECC mode, each entry of protection storage 45 stores corresponding check bits for the corresponding entry within banks 0-7. For example, the first entry of protection storage 45 stores the check bits corresponding to the data stored in the first entry of each of banks 0-7. In parity mode, though, each entry of protection storage 45 stores a parity bit corresponding to an entry in each of banks 0-7. For example, in parity mode, the first entry of protection storage 45 stores a parity bit for the first entry in each of banks 0-7, Therefore, in the illustrated embodiment in which there are 8 banks, each entry of protection storage 45 stores 8 bits of parity, one for each of banks 0-7.

In EDC/ECC mode, shared XOR tree 52 is coupled to receive information from each of bank 0 through bank 7 and from protection storage 45. In EDC/ECC mode, shared XOR tree 52, based on information received from other portions of cache control circuitry 38 (which may come from bus 24), or from a particular entry in each of banks 0-7, or a combination of both, generates check bits 56 which are provided to protection storage 45 for storage in a corresponding entry. Also, in EDC/ECC mode, shared XOR tree 52, based on information received from a particular entry in each of banks 0-7 and corresponding check bits from protection storage 45, generates syndrome bits 58 which are provided to correction logic 54. In EDC/ECC mode, correction logic 54 also receives the information from the particular entry in each of banks 0-7 and uses the corresponding syndrome bits 58 to perform multi-bit error detection, and optionally (for embodiments implementing EDC) correct the received information and provide the corrected information from the particular entry of banks 0-7 to way 0 select logic 60. Therefore, way 0 select logic 60, based on the value of mode 62, either provides the output of correction logic 54 to output select logic 37 (if in ECC mode) or the output of one or more of banks 0-7 directly to output select logic 37 (if in EDC or parity mode). When a cache hit occurs in way 0, output select logic selects the output of way 0 select logic 60 to provide to bus 24. Note that in parity mode, the corresponding parity bits may also be provided to output select logic 37 from protection storage 45. Also, error detection and correction logic 54 may provide an error indicator to bus 24 to indicate whether or not an error occurred.

Note that, in one embodiment, in EDC mode, only error detection is performed. In this case, multiple bit errors are detected, but the errors are not corrected prior to being output to output select logic 37. In this case, the error indicator can be asserted to indicate an error since the error was not corrected. Also in this case, error detection and correction logic 54 may be referred to as error detection logic, and the output of error detection logic need not be provided to way 0 select logic 60. That is, in this embodiment, way 0 select logic 60 may not be needed since the uncorrected bits can be provided directly from banks 0-7.

Therefore, for a cache hit read operation in parity mode, or when operating with EDC, select logic 60 provides the output of the accessed entry in one or more of banks 0-7, as well as the corresponding parity bits, to output select logic 37. For a cache hit read operation in ECC mode, select logic 60 provides the output of error detection and correction logic 54 to output select logic 37. For a cache hit write operation in parity mode or a cache allocation operation performed upon a cache miss in parity mode, the write data is provided directly to an entry in one or more of banks 0-7 which is addressed by the write operation access address. That is, a write may be performed to any number of banks in banks 0-7, and the corresponding parity bits in the corresponding entry of protection storage 45 also get updated on a per-bit basis after generation in shared XOR tree 52. In this manner, if only one bank is written to as a result of the write operation, then only one bit in the corresponding entry of protection storage 45 is updated. The updating of parity bits in parity mode may be performed by logic within control logic 46 (not shown) in a known manner.

For a full write operation in EDC/ECC mode, in which all of banks 0-7 are written to (i.e. in which the full cache data field is written to), a read-modify-write (RMW) operation need not be performed. In this manner, a full write operation (a write to all banks of memory storage circuitry 40) can be performed with one or a single access (e.g. in a single processor cycle or a single clock cycle). In this case, the write data is provided to each entry of banks 0-7 addressed by the full write operation access address. The write data is also provided to shared XOR tree 52 which generates the corresponding check bits and provides them via check bits 56 to protection storage 45 for storage in the corresponding entry. In one embodiment, shared XOR tree 52 is combinational logic where the generation and write back of the check bits can be completed in the same processor or clock cycle as the write of the write data to banks 0-7.

For a partial write operation in EDC/ECC mode, in which less than all of banks 0-7 is written to, a read-modify-write (RMW) is needed. Therefore, performing a write operation to less than all of banks 0-7 (i.e. to less than the full cache data field) requires multiple accesses (e.g. multiple processor cycles or clock cycles), and cannot be performed with a single access as is the case for a full write operation. Due to the complexity of implementing the read-modify-write operation, write operations to less than all banks 0-7 may not be supported in some embodiments. Thus, in these embodiments, for writeable data, parity protection may be selected, while for instruction information, which is only written when updating all of banks 0-7 on a cache miss, multi-bit EDC/ECC may be selected, with the selection based on the way allocation control settings.

By now it should be appreciated that there has been provided a cache whose ways are capable of operating in either parity or EDC/ECC mode, based on the way allocation control field for each particular way. In this manner, each way of a cache can operate using parity for single bit error detection or using EDC/ECC which allows for multi-bit error detection and correction, if desired. Furthermore, the error detection scheme for each way may be dynamically changed during operation by dynamically changing the values of the way allocation control fields of the way allocation control register, resulting in additional flexibility.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system which includes processing circuitry for executing a plurality of data processing instructions; a unified cache memory coupled to the processing circuitry for storing data and instructions processed by the processing circuitry, the unified cache memory including a plurality of sets, each set comprising a plurality of ways, each way including one or more information fields; and cache memory control circuitry coupled to the unified cache memory and including a control register for allocation control to control allocation of each way of the plurality of ways for one of: (1) a first type of information; (2) a second type of information; or (3) both the first type of information and the second type of information, the cache memory control circuitry further individually controlling a selection of a type of error detection among a plurality of types of error detection for each way of the unified cache memory based upon the allocation control indicated by the control register. Item 2 includes the data processing system of item 1 wherein the first type of information is data information and the second type of information is instruction information. Item 3 includes the data processing system of item 2 wherein the first type of information is correlated to selecting single bit error detection and the second type of information is correlated to selecting multiple bit error detection. Item 4 includes the data processing system of item 3 wherein the second type of information further comprises read-only data information. Item 5 includes the data processing system of item 3 wherein the data information is modifiable data information. Item 6 includes the data processing system of item 3 wherein the second type of information is correlated to selecting multiple bit error detection and correction. Item 7 includes the data processing system of item 3 wherein the control register is user accessible for individually dynamically modifying the type of error detection for each of a plurality of separate ways of the unified cache memory. Item 8 includes the data processing system of item 1 wherein the plurality of types of error detection comprise parity checking, error detection code (EDC) and error correction code (ECC).

Item 9 includes a method which includes providing processing circuitry for executing a plurality of data processing instructions; coupling a unified cache memory to the processing circuitry for storing data and instructions processed by the processing circuitry, the unified cache memory including a plurality of sets, each set comprising a plurality of ways, each way including one or more information fields; coupling a cache memory control circuitry to the unified cache memory; and providing control circuitry for allocating each way of the unified cache memory for one of: (1) a first type of information; (2) a second type of information; or (3) both the first type of information and the second type of information, the control circuitry further individually controlling a selection of a type of error detection among a plurality of types of error detection for each way of the unified cache memory based upon a result of the allocating. Item 10 includes the method of item 9 and further includes selecting the first type of information as data information; and selecting the second type of information as instruction information. Item 11 includes the method of item 10 and further includes correlating the first type of information to selecting single bit error detection as the type of error detection; and correlating the second type of information to selecting multiple bit error detection as the type of error detection. Item 12 includes the method of item 11, and further includes forming the second type of information as read-only data information. Item 13 includes the method of item 12 and further includes forming the data information as modifiable data information. Item 14 includes the method of item 11 and further includes correlating the second type of information to selecting multiple bit error detection and correction as the type of error detection. Item 15 includes the method of item 11 and further includes individually dynamically modifying the type of error detection for each way of the unified cache memory through user access to the control circuitry. Item 16 includes the method of item 11 and further includes individually selecting one of parity checking, error detection code (EDC) and error correction code (ECC) for each separate way of the unified cache memory based upon the result of the allocating.

Item 17 includes a data processing system including a processing unit for executing a plurality of data processing instructions; a unified cache memory coupled to the processing unit for storing data and instructions processed by the processing circuitry, the unified cache memory including a plurality of ways, each way comprising a plurality of lines, each line including an information field; first control circuitry coupled to the unified cache memory and comprising an allocation control register for allocating each way of the plurality of ways for either a first type of information or a second type of information, or for both the first type of information and the second type of information; and second control circuitry coupled to the first control circuitry for further individually selecting a mode of error detection for each way of the unified cache memory based upon the allocating performed by the first control circuitry. Item 18 includes the data processing system of item 17 wherein the first type of information is data information that is correlated to the second control circuitry selecting single bit error detection as the mode of error detection, and the second type of information is instruction information that is correlated to the second control circuitry selecting multiple bit error detection as the mode of error detection. Item 19 includes the data processing system of item 17 wherein the first control circuitry is user accessible for individually dynamically modifying the type of error detection for each of the plurality of ways of the unified cache memory. Item 20 includes the data processing system of item 17 wherein the first control circuitry further comprises a storage device comprising a plurality of control fields, each of the plurality of control fields being correlated to a predetermined way of the plurality of ways of the unified cache memory for storing an encoded binary value that controls information type allocation for the predetermined way.

What is claimed is:

1. A data processing system comprising:
   processing circuitry for executing a plurality of data processing instructions;
   a unified cache memory coupled to the processing circuitry for storing data and instructions processed by the processing circuitry, the unified cache memory comprising a plurality of sets, each set comprising a plurality of ways, each way comprising one or more information fields; and
   cache memory control circuitry coupled to the unified cache memory and comprising a control register for allocation control to control allocation of each way of the plurality of ways for one of: (1) a first type of information; (2) a second type of information; or (3) both the first type of information and the second type of information, the cache memory control circuitry further individually controlling a selection of a type of error detection among a plurality of types of error detection for each way of the unified cache memory based upon the allocation control indicated by the control register.

2. The data processing system of claim 1 wherein the first type of information is data information and the second type of information is instruction information.

3. The data processing system of claim 2 wherein the first type of information is correlated to selecting single bit error detection and the second type of information is correlated to selecting multiple bit error detection.

4. The data processing system of claim 3 wherein the second type of information further comprises read-only data information.

5. The data processing system of claim 3 wherein the data information is modifiable data information.

6. The data processing system of claim 3 wherein the second type of information is correlated to selecting multiple bit error detection and correction.

7. The data processing system of claim 3 wherein the control register is user accessible for individually dynamically modifying the type of error detection for each of a plurality of separate ways of the unified cache memory.

8. The data processing system of claim 1 wherein the plurality of types of error detection comprise parity checking, error detection code (EDC) and error correction code (ECC).

9. A method comprising:
providing processing circuitry for executing a plurality of data processing instructions;
coupling a unified cache memory to the processing circuitry for storing data and instructions processed by the processing circuitry, the unified cache memory comprising a plurality of sets, each set comprising a plurality of ways, each way comprising one or more information fields;
coupling a cache memory control circuitry to the unified cache memory; and
providing control circuitry for allocating each way of the unified cache memory for one of: (1) a first type of information; (2) a second type of information; or (3) both the first type of information and the second type of information, the control circuitry further individually controlling a selection of a type of error detection among a plurality of types of error detection for each way of the unified cache memory based upon a result of the allocating.

10. The method of claim 9 further comprising:
selecting the first type of information as data information; and
selecting the second type of information as instruction information.

11. The method of claim 10 further comprising:
correlating the first type of information to selecting single bit error detection as the type of error detection; and
correlating the second type of information to selecting multiple bit error detection as the type of error detection.

12. The method of claim 11 further comprising:
forming the second type of information as read-only data information.

13. The method of claim 11 further comprising:
forming the data information as modifiable data information.

14. The method of claim 11 further comprising:
correlating the second type of information to selecting multiple bit error detection and correction as the type of error detection.

15. The method of claim 11 further comprising:
individually dynamically modifying the type of error detection for each way of the unified cache memory through user access to the control circuitry.

16. The method of claim 11 further comprising:
individually selecting one of parity checking, error detection code (EDC) and error correction code (ECC) for each separate way of the unified cache memory based upon the result of the allocating.

17. A data processing system comprising:
a processing unit for executing a plurality of data processing instructions;
a unified cache memory coupled to the processing unit for storing data and instructions processed by the processing circuitry, the unified cache memory comprising a plurality of ways, each way comprising a plurality of lines, each line comprising an information field;
first control circuitry coupled to the unified cache memory and comprising an allocation control register for allocating each way of the plurality of ways for either a first type of information or a second type of information, or for both the first type of information and the second type of information; and
second control circuitry coupled to the first control circuitry for further individually selecting a mode of error detection for each way of the unified cache memory based upon the allocating performed by the first control circuitry.

18. The data processing system of claim 17 wherein the first type of information is data information that is correlated to the second control circuitry selecting single bit error detection as the mode of error detection, and the second type of information is instruction information that is correlated to the second control circuitry selecting multiple bit error detection as the mode of error detection.

19. The data processing system of claim 17 wherein the first control circuitry is user accessible for individually dynamically modifying the type of error detection for each of the plurality of ways of the unified cache memory.

20. The data processing system of claim 17 wherein the first control circuitry further comprises a storage device comprising a plurality of control fields, each of the plurality of control fields being correlated to a predetermined way of the plurality of ways of the unified cache memory for storing an encoded binary value that controls information type allocation for the predetermined way.

* * * * *